Jan. 21, 1964 R. W. SCOTT 3,118,976

AUTOMATIC TELEPHONE DIALING ATTACHMENT

Filed Sept. 9, 1960 2 Sheets-Sheet 1

INVENTOR.
RAY W. SCOTT
BY
Flam and Flam
ATTORNEYS.

AUTOMATIC TELEPHONE DIALING ATTACHMENT

Filed Sept. 9, 1960 2 Sheets-Sheet 2

INVENTOR.
RAY W. SCOTT
BY
Flam and Flam
ATTORNEYS.

3,118,976
AUTOMATIC TELEPHONE DIALING ATTACHMENT

Ray W. Scott, 2848 W. 9th St., Los Angeles, Calif.

Filed Sept. 9, 1960, Ser. No. 54,890
5 Claims. (Cl. 179—90)

This invention relates to an automatic dialing attachment for a telephone system, and utilizing a group of memory units representing frequently used telephone numbers. Each of the memory units may be selectively combined with a conventional telephone circuit to function in place of the manually operated telephone finger wheel.

The first step in the normal operation of a telephone is to remove the handset from its cradle, which serves to complete a circuit between that telephone and the associated central equipment of the telephone exchange. To dial a prefix or digit of a telephone number, the completed circuit is then subjected to a number of closely spaced interruptions (that is, the circuit is successively opened and closed) corresponding to the character (prefix or digit) which has been dialed on the finger wheel. In a large exchange area, completion of a call may depend upon six or seven sets of interruptions separated by dwell periods.

The primary object of this invention is to provide a simple automatic dialing system that can be used as an attachment to an existing telephone instrument whereby frequently called telephone numbers can be dialed quickly, easily, and without error. Use is made of a memory unit that, at command, appropriately operates a circuit interrupter.

Another object of this invention is to provide a simple arrangement whereby memory units in the form of code wheels can be added, removed or replaced, thereby providing a versatile system. To accomplish this purpose, the code wheels are stacked together on a common shaft, and each wheel has a slot which, with a unique yielding friction arrangement, makes possible ready insertion and removal.

A further object of this invention is to provide a code wheel on which the program or information may be changed. To accomplish this purpose, use is made of novel, substantially U-shaped clips which may be affixed at any of a plurality of spaced positions extending along the circumference of each code wheel.

Another object of this invention is to provide a circuit interrupter which, by a unique arrangement, can be operatively associated with any selected code wheel. To accomplish this purpose, a pair of opposed spring arms forming a part of the interrupter are mounted on a block which is slidably supported on a pair of rods parallel to the mounting shaft for the code wheels.

A still further object of this invention is uniquely to use the mounting rods as a means of connecting the opposed spring arms to the telephone circuit. To achieve this circuit relationship, simple brush means are used to connect the opposed spring arms to the rods.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings.

Figures 5, 6, 7, 8, 9, 10, 11:
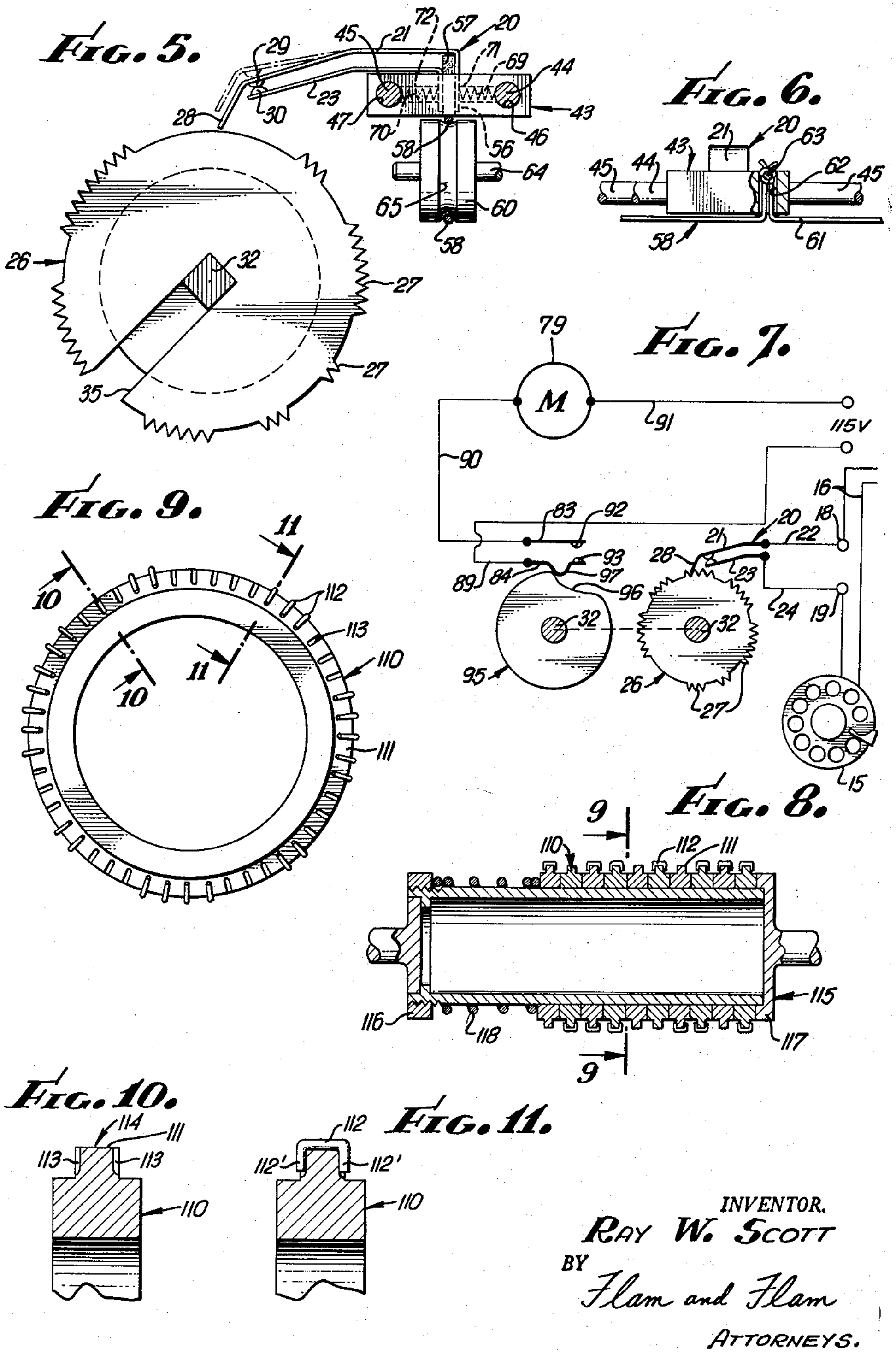
FIG. 5 is a sectional view, taken along the plane indicated by line 5—5 in FIG. 2.
FIG. 6 is an enlarged fragmentary sectional view, taken along the plane indicated by line 6—6 in FIG. 2.
FIG. 7 is a wiring diagram.
FIG. 8 is a fragmentary sectional view of a modified code wheel mounted on an appropriate shaft.
FIG. 9 is an enlarged sectional view, taken along the plane indicated by line 9—9 in FIG. 8.
FIG. 10 is an enlarged fragmentary sectional view, taken along the plane indicated by line 10—10 in FIG. 9.
FIG. 11 is an enlarged fragmentary sectional view, taken along the plane indicated by line 11—11 in FIG. 9.

In FIG. 7 there is illustrated a telephone finger wheel 15 normally associated with the instrument at a telephone station. The telephone is connected to the central telephone equipment by a circuit including a twin lead 16, a fragmentary part of which is illustrated in FIG. 7. When the finger wheel is operated, a circuit associated with the instrument is subjected to a series of interruptions.

Figure 1:
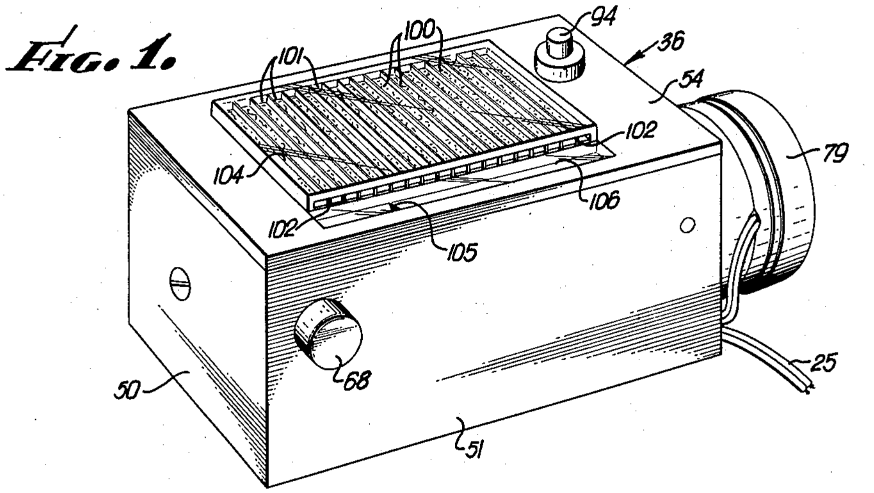
FIGURE 1 is a pictorial view, showing an embodiment of the present invention.

The automatic dialing attachment includes a normally closed circuit controller 20 intended to operate, when desired, in place of the interrupter provisions associated with the telephone finger wheel 15. For this purpose, one of the leads 16 is opened and terminals 18 and 19 are formed to which the circuit controller or interrupter 20 is connected. Thus, one spring arm 21 is connected by a lead 22 to the terminal 18 and the other spring arm 23 is connected by a lead 24 to the opposite terminal 19. The leads 22 and 24 may be carried in a twin insulation cable 25 as illustrated in FIG. 1.

When the attachment is inactive, the circuit controller connects the terminals 18 and 19 together, and the telephone finger wheel can be used, just as if the attachment were not present. However, the normally closed circuit controller can be operated in place of the telephone finger wheel after the receiver is lifted since it makes no difference at what point the circuit is interrupted.

For operating the circuit controller 20, a code wheel 26 in the form of a disc mounted upon a rotary shaft 32 is provided. The code wheel 26 has encoding means in the form of a series of peripherally formed integral teeth 27 arranged in sets. The teeth on the code wheel illustrated in FIG. 5 (reading in a clockwise direction from the starting position illustrated) are located in interrupted angular array in groups of 3, 8, 2, 3, 6, 8 and 9. The teeth engage a downwardly turned end 28 of the spring arm 21 and deflect the arm 21 upwardly so that the button contacts 29 and 30 of the two spring arms separate. As the wheel is rotated through one cycle, a telephone number, such as DUnkirk 2–3689 is dialed. The desired groupings of teeth on the code wheel 26 are achieved by the user knocking off the appropriate teeth from the full set initially formed around the circumference of the disc.

Figures 2, 3, 4:
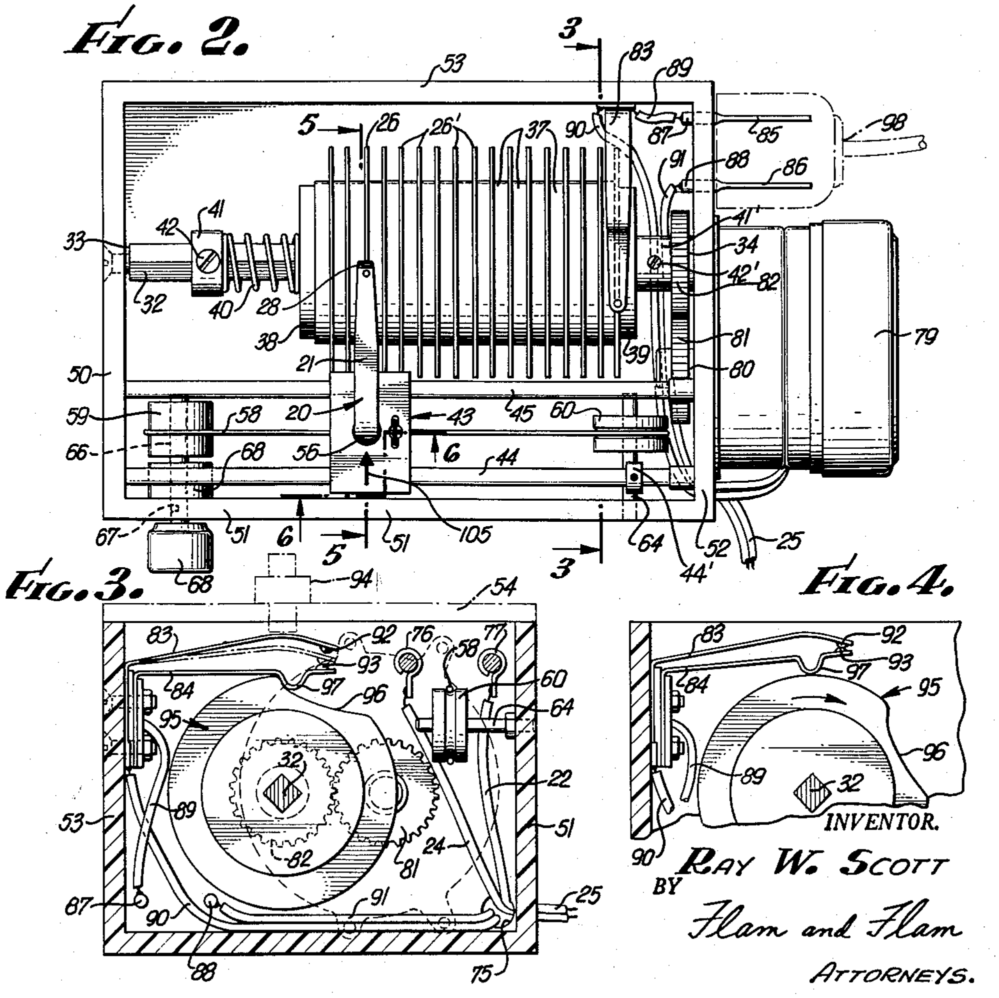
FIG. 2 is a top plan view in which the lid or top of the case has been removed.
FIG. 3 is a sectional view, taken along the plane indicated by line 3—3 in FIG. 2.
FIG. 4 is a fragmentary sectional view, showing a portion of the apparatus of FIG. 3 in a different operating position.

Furthermore, a plurality of specific telephone numbers each can be automatically dialed by providing an equivalent plurality of code wheels 26′ conveniently mounted in side-by-side relationship along the shaft 32 (as shown in FIG. 2).

A case 36 made of electrical insulation material, mounts the ends 33 and 34 of the shaft 32 and houses the code wheels and other mechanism to be hereafter described.

In order to provide an arrangement whereby these code wheels 26' can be removed or replaced on the shaft 32, each of the discs is bifurcated by a rectangular slot 35. The shaft 32 is square in cross section in order to fit the inner end of the slot 35 and to provide a driving connection between the shaft and the disc. Consequently, when the shaft is rotated, the code wheels are also turned. The non-circular arrangement also makes it possible for the discs to be aligned on the shaft, particularly to determine the starting positions thereof, relative to the circuit controller 20.

To ensure that the circuit controller 20 is engageable with the discs 26' individually, the discs are suitably spaced along the shaft 32. For this purpose, a plurality of round spacers 37 are provided that are mounted on the square shaft 32 between the discs 26'. The stack of discs 26' and the spacers 37 are included between end plates 38 and 39. To position the stack accurately, along the shaft 32 and to hold the discs and spacers in assembled relationship, a spring 40 is provided. The spring reacts against a collar 41 adjustably mounted along the shaft 32 by the aid of a set screw 42, and engages one end plate 38 to urge the stack and the opposite end plate 39 against a gear hub 41'. The hub 41' is also adjustably secured to the shaft 32 by a set screw 42'.

In order that the circuit controller 20 may be aligned opposite any one of the discs 26', it is mounted upon a block 43 which is slidably supported on spaced rods 44 and 45 paralleling the shaft 32.

The rods pass respectively through elongated parallel apertures 46 and 47 (FIG. 5) of the block 43. The block is accordingly guided for rectilinear translation parallel to the shaft axis.

The ends of the rods are supported at the respective side walls 50 and 52 of the case 36, as illustrated in FIG. 2.

The spring arms have base ends bent at right angles and entering an upwardly opening recess 56 in the mounting block 43. This recess is located between the guiding apertures 46 and 47 for purposes presently to be described. An insulation piece 57 wedged between the base ends of the arms holds them at diametrically opposite positions in the recess, thereby firmly mounting them.

In order to position the mounting block along the guide rods 45 and 46, an endless cord 58 cooperable with a pulley system (supported by means described below) is secured to the block. The cord 58 extends parallel to the rods, and is supported by two pulleys 59 and 60 on the inside of the front wall. The upper run 61 of the cord extends beneath the mounting block 43. The ends of the cord (in the upper run) are passed upwardly of a vertical aperture 62 in the mounting block 43. The cord ends are tied to a peg 63 carried by the block.

The right-hide pulley 60 is slidably supported on an axle 64 which projects inwardly from the front wall 51 of the case. This freely riding pulley 60 is maintained on the axle 64 by virtue of the tensioned cable 58 which rides in a groove 65 (FIG. 5) provided in the rim of the pulley.

The left side, flat rimmed pulley 59 is affixed on a shaft 66 which passes through an aperture 67 in the front wall. The shaft is rotatably supported by a sleeve bearnig 68 bonded to the inside of the front wall. Movement of the mounting block 43 through the pulley system is facilitated by turning a knob 68 mounted on the outer end of the shaft 66.

In order to connect the mounted spring arms 21 and 23 to the terminals 18 and 19 of the telephone circuit, a pair of small coil springs or brushes 69 and 70 are provided. Each spring is confined in a bore 71 and 72 that extends from one side of the recess 56 for the circuit controller 20 to one of the elongate parallel apertures 46 or 47 through which the supporting rods pass. Thus, the ends of each brush 69 and 70 bear against one of the rods 44 or 45 and one of the spring arms 21 or 23. The springs maintain the contact to the rods regardless of the position of the mounting block.

The two leads 22 and 24, which are suitably nisulated, pass into the case 36 via an aperture 75 (FIG. 3). Clips 76 and 77 at the ends of each lead embrace the ends of the respective rods to complete the connections.

The completed telepheone circuit can be interrupted by rotating the mounted code wheels which are selectively engaged by the circuit controller. The shaft 32 upon which the wheels are mounted may be rotated by any appropriate means, such as a hand crank, spring drive or electric motor. In this instance, a small electric motor 79 powered by a standard 115 volt supply, is provided. The motor 79 is secured on the outside of the right side wall 52 by any appropriate fastening means. The shaft 80 of the motor 79 projects into the interior of the case through an aperture (not shown) in the wall.

In order to transmit the rotation from the motor 79 to the code wheel shaft 32, a gear 81 mounted on the motor shaft 80 engages a second gear 82 mounted on the code wheel shaft. The second gear 82 is situated on the shaft 32 beyond the collar 41 adjacent the side wall 52.

In order to control the motor, the power circuit for the motor includes a pair of opposed spring arms 83 and 84 (FIGS. 3, 4 and 7). The base ends of the opposed spring arms are bent downwardly at right angles (as shown in FIG. 3) and are mounted by suitable means on the back wall 53 of the case 36 in proximity to the right side wall 52.

Exteriorly accessible prongs 85 and 86, mounted on the side wall 52 have base ends providing power terminals 87 and 88 inside the case. Thus, the prongs may cooperate with an extension cord 98, as shown in FIG. 2.

The bottom spring arm 84 is attached to a lead 89 (FIGS. 3 and 7) which connects to one power terminal 87. The other power terminal 88, and the other spring arm 83 connect to terminals of the motor by leads 90 and 91 which pass through the aperture 75 in the right side wall.

Button contacts 92 and 93 on the switch arms 83 and 84 are normally biased apart to keep the motor circuit open. The power circuit for the motor is completed by depressing a switch button 94 mounted in the lid 54 of the case. The button 94 deflects the top spring arm 83 downward (as shown by the phantom lines in FIG. 3) so that the contacts 92 and 93 of the spring arms abut. Accordingly, the motor turns the code wheel shaft 32 through the gearing described above.

In order to provide a means whereby the continued depression of the switch button 94 is unnecessary and to automatically stop the motor after one revolution of the code wheels, the switch spring arms 83 and 84 are cooperable with a holding cam 95 mounted on the code wheel shaft 32. The cam 95 is generally circular, except for a relieved portion 96 of about 45°. The unrelieved periphery of the cam engages an intermediate U-bend 97 formed in the bottom spring arm 84.

In the rest position, illustrated by the full lines in FIG. 3, the relieved portion permits the arms to separate and the motor circuit is open. To actuate the motor, the switch arm 83 is depressed (as illustrated by the phantom lines in FIG. 3) by the switch button 94 and the shaft 32 turns. As soon as this occurs, the bottom spring arm 84 is urged upwardly by the cam 95 (as shown in FIG. 4) so that the engagement of the opposed spring contacts 92 and 93 is maintained without continued depression of the switch button 94. The button is then released. Upon a completion of one revolution of the code wheel shaft, the selected telephone number has been dialed and the relieved portion 96 of the cam 95 then allows the bottom spring arm 84 to retract to its normal or rest position and the circuit is broken. The motor is thus automatically stopped. The code wheels are, of course, angularly oriented with respect to the cam 95 to ensure that the starting position of each code wheel is suitably situated relative to the circuit controller 20. A stop 44′ on the rod 44 and cooperable with block 43 ensures that the spring arms of the circuit controller 20 do not engage the spring arms associated with the holding cam 95.

To identify each of the spaced code wheels 26′, a plurality of legend bearing, replaceable narrow cards 100 are provided. (See FIG. 1.) The cards 100 are inserted in a number of slips 101 formed on the lid 54 of the case 36 by a plurality of spaced, parallel, thin dividers 102 bonded to the lid 54. The entire group of cards is viewable through a transparent, plastic window 104 affixed to the dividers. The card identifying the code wheel then engaged by the circuit controller is indicated by a pointer 105 (FIGS. 1 and 2) drawn on the adjustable mounting block 43. The pointer is viewable through a transparent strip 106 inlaid in the lid 54 of the case 36. The inlaid strip 106 extends along the edges of the identifying cards 100.

In FIGS. 8 through 11 there is disclosed a modified shaft adapted for mounting a code wheel 110 upon which the program may be changed. In this form the code wheel is a disc that has a peripheral rim or flange 111.

In order to form a pattern of raised surfaces or teeth to engage the circuit interrupter 20, a group of substantially C-shaped tabs or clips 112 (FIGS. 9 and 11) are provided. The tabs 112, which serve as the encoding means, detachably embrace the rim 111 and are suitably angularly spaced to provide the desired sets of projections. To hold the tabs 112 in place a series of spaced radially extending slots 113 are formed entirely around both sides of the peripheral flange 111. The legs 112′ of the clips engage aligned slots 113 of the respective sets 114 (FIG. 10). Preferably, the legs 112′ of the tabs are flexed when placed upon the flange or rim 111 in order to provide a positive frictional gripping force.

Any desired phone number can be programed by appropriately placing the tabs 112 about the code wheel. Moreover, the programed phone number can be changed by altering the arrangement of the tabs.

A modified form of code wheel shaft 115 adapted for mounting the alternate form of code wheels 110 is shown in FIG. 8. This shaft has flanges 116 and 117 formed at each end. The flange at the left is a threaded ring which is removable so that the code wheels 110 can be inserted on or removed from the shaft 115. When the code wheels are on the shaft 115 they are maintained in frictional contact with the adjacent members and against the flange 117 by a spring 118 which reacts against the ring 116 and the corresponding end code wheel.

The inventor claims:

1. In an automatic telephone dial system: a shaft; means for rotating the said shaft; means for initiating and terminating the rotation of the said shaft; a plurality of code wheels mounted in side-by-side relationship on the shaft; a plurality of clips for each code wheel and detachably mounted on the code wheels to form peripheral teeth arranged in sets of selected numbers; a circuit controller adapted to be serially inserted in a telephone circuit; means for adjustably positioning the said circuit controller opposite a selected code wheel; the circuit controller being engaged by the selected code wheel such that the telephone circuit is subjected to interruptions as the wheel is rotated.

2. The combination as set forth in claim 1, in which each of the said discs are provided with sets of angularly spaced slots extending uniformly about the periphery of the discs on opposite sides thereof for receiving the clips and holding them in position.

3. In an automatic telephone dial system: a shaft; means for rotating the said shaft; means for initiating and terminating the rotation of the said shaft; a plurality of code wheels each having encoding means extending in interrupted angular array for operating a circuit controller, said code wheels being mounted in side-by-side relationship on the said shaft; a circuit controller having two terminals; a pair of spaced electrically conductive rods paralleling the said shaft and having provisions for connection to a telephone circuit; a mounting block for said circuit controller, slidably supported on the pair of spaced rods; brushes carried by the mounting block and contacting the respective rods; means connecting the brushes respectively to the terminals of the circuit controller; said circuit controller being individually cooperable and affected by the encoding means of any one of the code wheels such that the telephone circuit may be interrupted.

4. In an automatic telephone dial system: a shaft; means for rotating the said shaft; means for initiating and terminating the rotation of the said shaft; a plurality of code wheels each having encoding means extending in interrupted angular array for operating a circuit controller, said code wheels being mounted in side-by-side relationship on the said shaft; a circuit controller means individually cooperable with each of the code wheels and adapted to be serially inserted in a telephone circuit; said circuit controlling means being affected by the encoding means on a selected code wheel as the wheel is rotated, such that the telephone circuit is interrupted; a case enclosing the shaft, code wheels and circuit controlling means; a plurality of spaced, parallel, thin dividers bonded to the lid of the case; a plurality of cards, each identifying one of the code wheels, and each placed between two of the said spaced, parallel, thin dividers; a transparent window affixed to the dividers and covering the cards; and a pointer cooperable with the circuit controlling means indicating the card identifying the code wheel engaged by the circuit controlling means.

5. In an automatic telephone dial system: a plurality of separate teeth; a support rotatable about an axis and providing a plurality of sets of defined peripheral spaces for frictionally receiving the teeth; the sets of spaces extending in side-by-side relationship along the axis of the support, and the spaces of each set extending uniformly and circularly about the axis of the support; a circuit controller having terminals for serial insertion in a telephone circuit; said circuit controller having a part engaged in sequence by the teeth of any one set for operating the circuit controller upon rotation of the support; and motive means for moving the support through one revolution.

References Cited in the file of this patent

UNITED STATES PATENTS

| | | |
|---|---|---|
| 1,593,992 | Smith | July 27, 1926 |
| 1,933,089 | Battegay | Oct. 31, 1933 |
| 2,061,273 | Green | Nov. 17, 1936 |
| 2,100,390 | Goff | Nov. 30, 1937 |
| 2,209,615 | Sengebusch | July 30, 1937 |
| 2,855,585 | Quinby | Oct. 7, 1958 |